Jan. 4, 1944.　　　S. H. MORTENSEN　　　2,338,593
GAS COOLED DYNAMO-ELECTRIC MACHINE
Filed Aug. 3, 1940　　　2 Sheets-Sheet 1

Inventor
S. H. Mortensen
by
Attorney

Jan. 4, 1944.   S. H. MORTENSEN   2,338,593
GAS COOLED DYNAMO-ELECTRIC MACHINE
Filed Aug. 3, 1940   2 Sheets-Sheet 2

Inventor
S. H. Mortensen
by
Attorney

Patented Jan. 4, 1944

2,338,593

UNITED STATES PATENT OFFICE 2,338,593

GAS-COOLED DYNAMOELECTRIC MACHINE

Soren H. Mortensen, Wauwatosa, Wis., assignor to Allis-Chalmers Manufacturing Company, Milwaukee, Wis., a corporation of Delaware Application August 3, 1940, Serial No. 350,826

12 Claims. (Cl. 171—252)

This invention relates in general to dynamo-electric machines enclosed in a gas-tight housing and cooled by a gas, such as hydrogen.

Hydrogen-cooled dynamo-electric machines, of the turbo-generator and synchronous condenser type, particularly such as are of great capacity, have recently acquired an important part in the electrical power industry. In apparatus of this character, the dynamo-electric machine proper is enclosed within a shell or housing which is wholly sealed from the outside atmosphere, the shell containing hydrogen or like gas under a small positive pressure. The hydrogen gas is circulated by fans on the rotor of the machine and is forced into intimate heat-absorbing engagement with the parts of the machine and is then forced outwardly to the outer part of the enclosure where it passes across or through one or more cooler units, usually in the form of a group of tubes, with headers at each end and mounted in a frame, and the header at one or both ends being provided with conduit connections for supplying cooling water to and discharging it from the cooler.

In hydrogen cooled machines of the prior art, the mounting of these cooler units in position within the machine enclosure and the arrangement of the supply and discharge conduits therefore have been such that whenever it was necessary to clean or inspect the interior of the cooler tubes, it was necessary to first remove the hydrogen content of the machine enclosure. As this latter operation has been a time consuming and expensive one, the latter, particularly by reason of the loss of the original hydrogen content and also the loss of a considerable amount of carbon dioxide, where the latter is used as a scavenging agent in removing the original content of hydrogen and again filling the machine with such gas.

The present invention contemplates a design and construction of dynamo-electric machine of the gas-cooled type utilizing one or more cooler units within the machine enclosure and having inlet and discharge connections to the outside, and wherein the cooler units are so related to the structure of the machine that they are fully sealed against leakage of air or hydrogen past such cooler units, but at the same time are arranged so that their end headers are accessible, to permit inspection and cleaning of the tubes of the cooler, from outside the machine without disassembling the latter or removing the hydrogen content thereof.

It is an object of the present invention to provide an improved design and construction of dynamo-electric machine of the type cooled by hydrogen or like gas and provided with one or more coolers within the hydrogen-filled machine enclosure, and at the same time accessible for inspection and cleaning of the cooler tubes without disassembling the machine or removing the hydrogen content thereof.

It is a further object of this invention to provide an improved design and construction of dynamo-electric machine of this type wherein the headers of the coolers are secured in gas-tight relation in the machine frame or supporting shell so as to prevent leakage of hydrogen or air past the same, and are provided with end covers accessible and removable for inspection and cleaning of the cooler tubes without disassembling the machine or removing the hydrogen content thereof.

These and other advantages are attained by the present invention, various novel features of which will be apparent from the description herein and accompanying drawings, disclosing an embodiment of the invention, and will be more particularly pointed out in the annexed claims.

Figure 1:
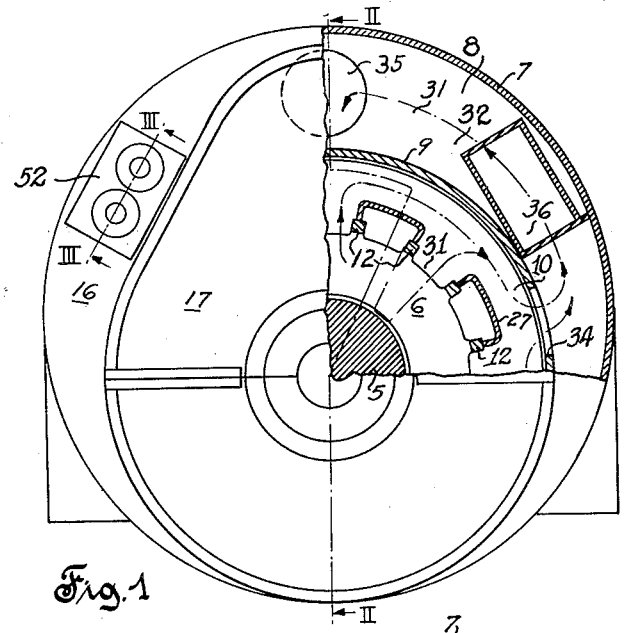
Fig. 1 is a broken end elevation of a dynamo-electric machine embodying features of the present invention.

In the drawings, 5 represents the rotor and 6 the stator core of the hydrogen-cooled dynamo-electric machine supported by and enclosed in a shell or housing 7 of generally cylindrical form and disposed eccentrically with respect to the rotor axis, as indicated. The rotor or field element may be of conventional form with an energizing winding, not shown, in slots at the outer periphery of the core, and the stator is of conventional laminated form, with the laminae arranged in groups or bundles providing radial ventilating spaces or ducts between adjacent groups of laminae. The stator core is supported from the outer shell through spaced radial plates 8 extending inwardly from the shell and secured thereto, as by welding, and an inner housing or shell 9 concentric about the axis of the rotor and having radial plates 10 secured to the inner side thereof. These radial plates 10, at their inner ends, suitably support longitudinally extending ribs 12 on which the laminations of the stator core 6 are assembled, the core laminations being suitably held in clamped position, as by end clamping members 14 and bolts 13 passing therethrough and into the end core laminations or the supporting ribs 12 therefor, the bolts having nuts or heads thereon bearing against such end clamping members.

The shell or housing 7 has end walls 16 integral therewith or connected thereto, as by welding, in a gas-tight sealing manner. These end walls are apertured and closed by removable end plates or covers 17 held in position in a gas-tight manner. These cover plates may be in a plurality of removably connected sections. Secured to each end of the inner shell 9 is a shield 19 of bell-shaped cross-section extending inwardly toward the rotor shaft, with its inner end extending axially inward or to form a housing for a fan 20 on the rotor shaft. The radially inner edge of the cover plate 17 is provided with a shaft seal, indicated generally at 23, of conventional form, which makes sealing engagement with a flange or runner 24 on the rotor shaft to effect a gas-tight seal between the cover plate 17 and the shaft.

Supply conduits or ducts 27 for the ventilating fluid are inserted in apertures in the radial plates 10 and held in position thereby, with the inner edges of the radial walls of these ducts secured to the laminae-supporting ribs 12, these ducts being open at their radially inner side to communicate with the conventional radial ventilating spaces through the stator core.

With the machine in normal operation, the fans 20 draw hydrogen axially inward from the spaces between the end closure plates 17 and the end shields 19, this hydrogen, discharged from the fans, passing radially outward over the end turns of the stator winding and axially inward through the ducts 27, and thence through the radial ventilating spaces in the stator core to the air gap and circumferentially therethrough and thence outwardly through these radial ventilating spaces. And after cooling the stator core, the hydrogen passes radially outward therefrom to chambers, intermediate adjacent ducts 27, of the space or passage 31 within the inner shell 9, the heated hydrogen passing circumferentially along such passage 31 to openings 34 through the shell 9 into the space or passage 32 between the inner shell 9 and the outer shell 7, where the hydrogen may travel circumferentially for a distance, from the lower portion of the machine toward the upper portion thereof. It is in this path of circumferential travel of the cooling gas that the auxiliary longitudinally extending cooler units, referred to hereinafter, are located in the path of the circumferentially moving hydrogen. After passing through the sections wherein the cooler units are located, the hydrogen travels axially toward the ends of the machine, the radial plates 8 being suitably apertured, as indicated at 35, to permit the desired axial flow through these portions of the passage. This passage 32 communicates at its ends, at points in substantially axial alignment with the apertures 35 in the radial plates 8, through the aperture in the end walls 16 of the shell, above the end shields 19, with the spaces between the end cover plates 17 and the shields 19, whence the hydrogen is recirculated as described hereinabove. The path of the ventilating gas to and from the stator core is indicated by the arrow lines in Fig. 1.

While the enclosing shell or housing 7 and the end cover plates 17 will dissipate to the outside atmosphere a certain amount of heat absorbed from the hydrogen passing within the shell and along the end closure plates, this absorption of heat is supplemented by the use or one or more cooling units 36, of generally conventional type, extending throughout the full length of the shell 7 and disposed in the space between the inner shell 9 and the outer shell 7, at a point or points in the circumferentially traveling stream of hydrogen in the passage 32 between the inner and outer shell.

Figure 4:
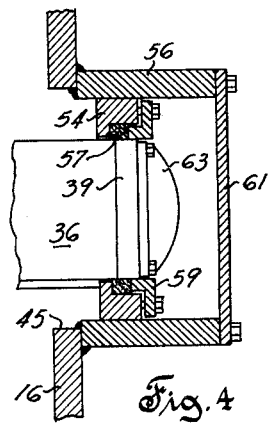
Figs. 3 and 4 are fragmental sectional views in the plane of the line III—III of Fig. 1, Fig. 3 showing the arrangement at that end of the machine shown in Fig. 1, and Fig. 4 the arrangement at the other end.
Figure 2:
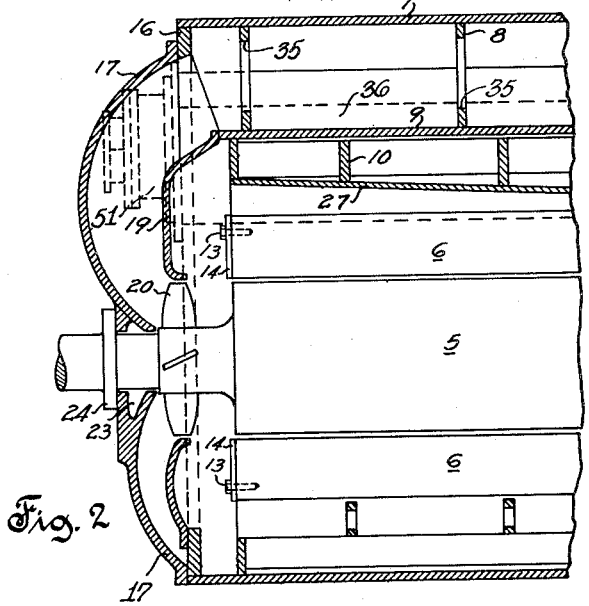
Fig. 2 is a fragmental section in the planes of line II—II of Fig. 1.
Figure 3:
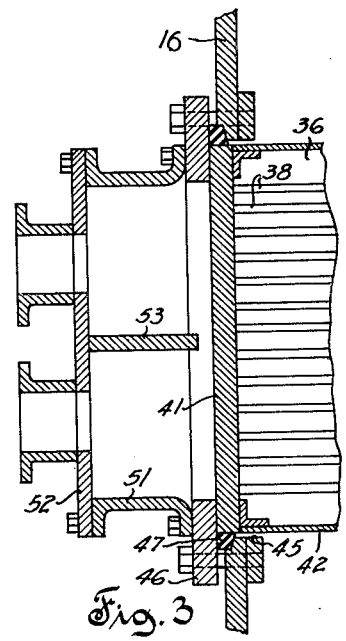
Figure 5:
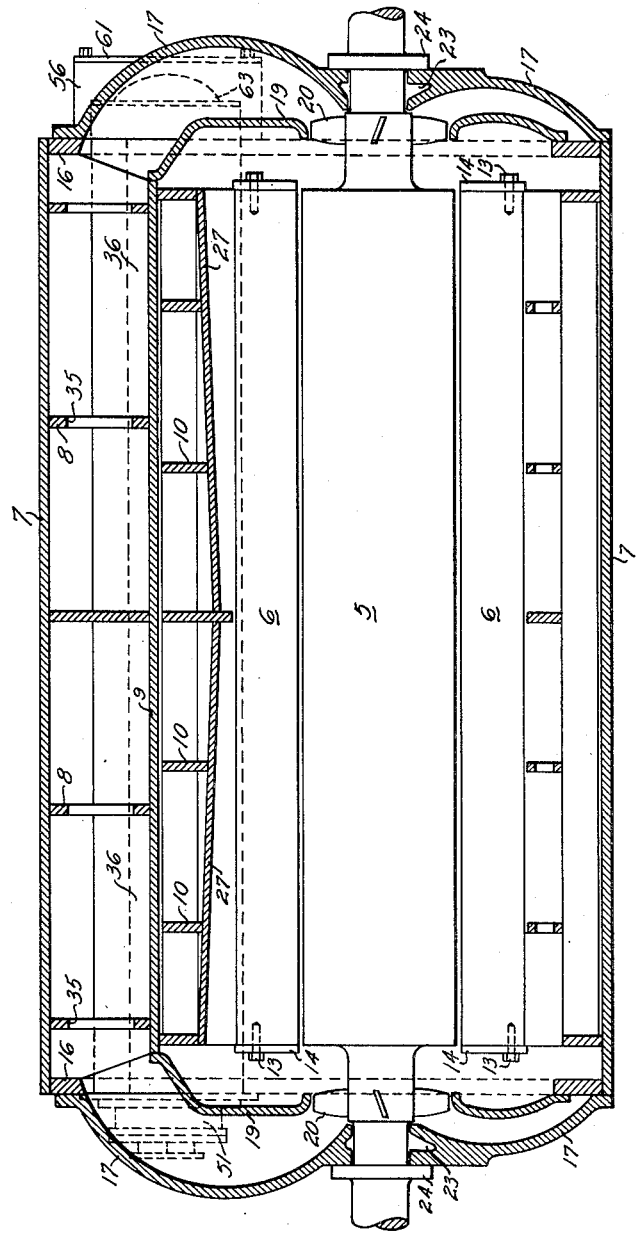
Fig. 5 is a section in the plane of the line II—II of Fig. 1 of the full length of the machine of Figs. 1 and 2.

As indicated more particularly in Figs. 3 and 4, the cooler units 36 are in the form of a group of longitudinally extending tubes 38 secured in a tube sheet 39 at one end of the cooler unit and a tube sheet 41 at the other end of such unit. The tube sheets are secured to or are a part of a supporting frame 42. The cooler unit is inserted to position in the machine by passing the same, from the left hand side of the machine, through apertures 45 in the end walls 16, radially outside of the adjacent edge portions of the end cover plates 16, and through alined openings in the radial plates 8 of the shell, these plates serving to support the cooler in desired position.

The tube sheet 41 of the cooler is mounted in the aperture 45 in the adjacent end wall 16 of the shell by bolts passing through the outer portion of the tube sheet, or preferably through a flange 46 welded in place thereon, and threaded into a portion of the end wall, with a gasket or washer 47 of gas impervious material securely clamped in position between the wall 16 of the shell and the header plate or sheet 41, in such a manner as to prevent the passage of air or hydrogen through the space between the tube sheet 41 of the cooler unit and the end wall 16.

A water head 51 is mounted in position on the outer face of the tube sheet 41, as by bolting the housing to the flange 46 thereon. And a cover plate 52 is removably secured on the outer end of the water head 51, as by bolting the cover plate to the water head with a liquid-tight gasket in the joint. As indicated, the cover plate 52 is provided with a dividing wall 53 at its inner face, the inner end of this wall being in relatively close engagement with the outer face of the tube sheet 41 at an intermediate point, to thus divide the space within the water head into an inlet and outlet chamber. As indicated, the cover plate 52 is provided with inlet and outlet connections, to which supply and discharge conduits may be connected as desired.

The tube sheet 39 at the other end of the machine is supported on an annular ring or flange 54, preferably welded on the inside of an annular housing 56 secured, as by welding to the outer face of the end wall 16 of the enclosing shell about the aperture 45 therein. A gas-tight sealing gasket 57 is inserted against an outwardly facing shoulder on the annular flange 54; and an annular gland ring 59 is operative to bear against this gasket 57 to compress the same to desired degree to establish effective sealing engagement with the adjacent edge of the tube sheet 39, to prevent leakage of gas to the outer side of the cooler unit, while at the same time permitting the necessary longitudinal floating movement incident to expansion or contraction of the cooler unit relative to the enclosing shell 7. The pressure exerting gland ring 59 may be held in desired adjusted position by screws passing through an outer flange thereon and threaded into the flange 54. A removable cover plate 61 is provided for the annular housing 56, this cover plate being removably secured to the outer face of the annular housing in a liquid-tight sealed manner. A water head 63 is removably secured by bolts in liquid sealed engagement with the outer face of the tube sheet 39, this water head permitting the return flow of cooling fluid from one set of tubes to the other, and with the plate 61 and the water head or closure 63 removed, access may be had to the interior of the tube elements of the cooler unit.

With the longitudinally extending cooler units supported in the enclosing shell 7 and secured in desired gas-tight sealing engagement therewith at points on the end walls of the shell which are outside of the removable end closure plates 17, it will be apparent that the desired passage of heated air circumferentially through the cooler units is attained, and the cooler units are mounted in position, and sealed against leakage of gas past them, in such a manner as to make the removable covers for the water heads accessible and removable at any time, without disturbing the hydrogen content of the machine, so that the interior of the water heads and tubes of the cooler may be inspected and cleaned.

It should be understood that the invention is not limited to the exact details of design and construction shown and described herein, for obvious modifications within the scope of the appended claims will be apparent to persons skilled in the art.

It is claimed and desired to secure by Letters Patent:

1. In an enclosed dynamo-electric machine, an enclosing housing having end walls including removable gas-tight end covers for closing and sealing end openings of said housing, a stator core mounted in position within said enclosing housing, said stator core being spaced from a portion of said enclosing housing, a cooling unit adapted to be supplied with cooling fluid from an external source and mounted and extending longitudinally in the space between said enclosing housing and said stator core in the path of travel of heated gas within said housing, said cooling unit being secured in gas-tight sealed relation with one of said end walls of said enclosing housing, and said cooling unit having a removable end cover giving access to the interior cooling elements of said cooling unit and disposed outside of the gas-tight seal between said cooling unit and said housing whereby access may be had to the interior of said cooling unit without providing an opening to the space within said enclosing housing.

2. In an enclosed dynamo-electric machine, an enclosing housing having apertured end walls and having its upper half of generally cylindrical shape, removable gas-tight end covers for the openings in said end walls, a stator core mounted in position within said enclosing housing, said stator core being spaced from said portion of said enclosing housing of generally cylindrical shape, a cooling unit adapted to be supplied with cooling fluid from an external source and mounted and extending longitudinally in the space between said generally cylindrical portion of said enclosing housing and said stator core in the path of travel of heated gas within said housing, said cooling unit being secured at each end thereof in gas-tight sealed relation with an end wall of said enclosing housing independently of the end cover plate, and said cooling unit having a removable end cover at each end thereof giving access to the interior cooling elements of said cooling unit and independent of the gas-tight seal between said cooling unit and said housing whereby access may be had to the interior of said cooling unit without providing an opening to the space within said enclosing housing.

3. In an enclosed dynamo-electric machine, an enclosing housing with its upper half of generally cylindrical form and having end walls including removable gas-tight end covers for closing and sealing end openings of said housing, a stator core mounted in position within said enclosing housing, a rotor operatively mounted in position within said stator core, said stator core being spaced from said cylindrical portion of said enclosing housing, a longitudinally extending cooling unit adapted to be supplied with cooling fluid from an external source and mounted in the space between said cylindrical portion of said enclosing housing and said stator core in the path of travel of heated gas within said housing, said cooling unit being secured at one end thereof in gas-tight sealed relation with the end wall of said enclosing housing, and said cooling unit having a removable end cover at said latter end thereof giving access to the interior cooling elements of said cooling unit and disposed axially outside of the gas-tight seal between said cooling unit and said end wall whereby access may be had to the interior of said cooling unit without providing an opening to the space within said enclosing housing, and means including a fan on said rotor for establishing flow of cooling gas within said housing past the heated portions of the stator core and outwardly therefrom to the space between said stator core and said enclosing housing and transversely through said cooler unit.

4. In an enclosed gas-cooled dynamo-electric machine, an enclosing housing, a stator core mounted in position within said enclosing housing in spaced relation thereto, a longitudinally extending cooling unit adapted to be supplied with cooling fluid from an external source and mounted in the space between said enclosing housing and said stator core in the path of travel of heated gas within said housing, one end of said cooling unit being positively secured in gas-tight sealed relation with a portion of said enclosing housing, and the other end of said cooling unit being impositively secured in position with respect to another portion of said enclosing shell to permit relative movement between said cooling unit and said shell in the direction of the longitudinal axis of said cooling unit, and said first end of said cooling unit being provided with a removable cover independent of said gas-tight seal and which permits access to the interior of said cooling unit from the end of the machine without opening the space within said housing to the surrounding atmosphere.

5. In an enclosed gas-cooled dynamo-electric machine, an enclosing housing having its upper portion of generally cylindrical form and provided with apertured end walls, removable gas-tight end covers for the openings in said walls, a stator core mounted in position within said enclosing housing, said stator core being spaced from a portion of said cylindrical portion of said enclosing housing, a cooling unit adapted to be supplied with cooling fluid from an external source and mounted and extending longitudinally in the space between said cylindrical portion of said enclosing housing and said stator core in the path of travel of heated gas within said housing, said cooling unit being positively secured at one end in gas-tight sealed relation with one of said end walls at a point radially outside of a portion of said adjacent end cover, and being impositively secured at the other end in gas-tight sealing relation with another of said end walls at a point radially outside of a portion of said adjacent end cover to permit relative movement between said cooling unit and said shell in the direction of the longitudinal axis of said cooling unit, and each end of said cooling unit at a point beyond said gas-tight seal being provided with a removable cover which permits access to the interior of said cooling unit without opening the space within said housing to the surrounding atmosphere.

6. In an enclosed dynamo-electric machine, a rotor, a stator surrounding said rotor, an enclosing housing the upper half of which is of substantially circular cross-sectional outline and having an end wall extending transversely of the longitudinal axis of the machine and provided with an aperture through which said rotor may be removed from the machine, a removable end cover plate secured to said end wall in gas-tight relation therewith about said aperture, said stator core being radially spaced from the upper portion of said enclosing housing, a cooling unit disposed in the space between the upper part of said enclosing housing and said stator core and extending longitudinally of the machine and located in the path of travel of heated gas within said housing, said cooling unit being secured in gas-tight sealing engagement with a second apertured portion of said end wall radially outside of an adjacent portion of said removable end cover plate, and a removable end cover for said cooling unit secured in position about the cooling elements of said cooling unit and independently of the securing of said end cover plate in position and, when removed from operative position, affording access to the interior of said cooling unit without providing an opening to the gas-containing space within said enclosing housing.

7. In an enclosed dynamo-electric machine, a rotor, a stator surrounding said rotor, an enclosing housing surrounding said stator and spaced therefrom, said housing being of generally cylindrical form over its upper half and having an end wall provided with an aperture in line with said rotor, an end cover plate removably secured about said aperture and in gas-tight sealing relation with said end wall, a cooling unit extending substantially parallel to the axis of the machine and disposed in the space between said cylindrical portion of said enclosing housing and said stator and in the path of heated ventilating gas within said housing, an aperture through said end wall radially beyond the radially adjacent portion of said removable end cover plate and in axial alinement with said cooling unit, said cooling unit being secured in gas-tight sealing engagement about the wall of said latter aperture and independently of said cover plate, and a removable header for the axial end of said cooling unit.

8. In an enclosed dynamo-electric machine, a rotor, a stator surrounding said rotor, a substantially cylindrical enclosing housing surrounding said stator and spaced therefrom and disposed eccentric with respect to said rotor and stator, said housing having an end wall at each longitudinal end thereof, said end walls being provided with apertures in line with said rotor permitting access to and endwise removal thereof, cover plates removably secured to said end walls in gas-tight sealing relation about the apertures therein, a cooling unit extending substantially parallel to the axis of the machine and disposed in the space between said enclosing housing and said stator and in the path of heated ventilating gas within said housing, longitudinally alined apertures in said several end walls of said housing radially beyond the adjacent portion of said removable end cover plates and in axial alinement with said cooling unit, said cooling unit being secured in gas-tight sealing engagement with the walls of said latter alined apertures in said end walls, and a removable header for one end of said cooling unit.

9. In an enclosed dynamo-electric machine, a rotor, a stator including a core surrounding said rotor, a supporting structure for said stator core comprising a substantially cylindrical shell spaced from said stator core and provided with a plurality of circumferentially spaced inlet ducts for cooling gas extending from an end of the stator core and longitudinally thereof, a substantially cylindrical enclosing housing surrounding and spaced from said shell and disposed eccentric with respect to said stator core and said shell, said enclosing housing having an inwardly extending end wall provided with an aperture through which said rotor is removable, a removable end closure for the aperture in said end wall and secured in gas-tight relation therewith, a cooling unit extending substantially parallel to the axis of the machine and disposed in the space between said enclosing housing and said shell and in the path of heated ventilating gas within said housing, said end wall portion of said enclosing housing being apertured radially beyond the adjacent portion of said removable end closure and in axial alinement with said cooling unit, and means for securing said cooler unit in operative position and in gas-tight sealing relation with said housing independently of said removable end closure, whereby access may be had to said cooling unit while said removable end cover plate remains in operative position.

10. In an enclosed dynamo-electric machine, a rotor, a stator including a core surrounding said rotor, a supporting structure for said stator core comprising a substantially cylindrical shell spaced from said stator core and provided with conduit means for supplying cool ventilating gas to said stator core, an enclosing housing having a substantially cylindrical upper half surrounding and spaced from said shell, said enclosing housing including a removable end closure for an aperture in an end of said enclosing housing through which said rotor may be removed, said end closure being secured in position through a gas-tight seal, a cooling unit extending substantially parallel to the axis of the machine and disposed in the space between the cylindrical portion of said enclosing housing and said shell and in the path of heated ventilating gas within said housing, and means for securing said cooling unit in operative position and in gas-tight sealed relation with said end wall in a second opening therein, and a removable closure independent of said first removable end closure and serving to close the interior of said cooling element, said second removable closure, on removal thereof, affording access to the cooling elements of said cooling unit without removal of said first end closure from operative position or disturbance of the gas-tight securing of said cooling unit.

11. In an enclosed dynamo-electric machine, an enclosing housing having an end wall including a removable gas-tight end cover for closing and sealing the space within said housing from the surrounding atmosphere, a stator core mounted in position within said housing and spaced therefrom, and a cooling unit adapted to be supplied with cooling fluid from an external source and mounted and extending longitudinally in the space between said stator core and a portion of said enclosing housing and in the path of travel of heated gas within said housing, said cooling unit being secured at one end in gas-tight sealed relation with said end wall of said enclosing housing, and said cooling unit being provided at said latter end with a removable cover independent of the gas-tight seal between said cooling unit and said end wall whereby on removal of said cover access may be had from the axial end of said cooling unit to the interior thereof without providing an opening to the space within said enclosing housing.

12. In an enclosed dynamo-electric machine, a rotor, a stator comprising a core surrounding said rotor, an enclosing housing surrounding and spaced from said stator core and having an end wall provided with an aperture through which said rotor may be removed longitudinally, a removable gas-tight closure for said aperture closing and sealing the space within said enclosing housing from the surrounding atmosphere, and a cooling unit adapted to be supplied with cooling fliud from an external source and mounted and extending longitudinally in the space between said stator core and a portion of said enclosing housing and in the path of travel of heated gas within said housing, said cooling unit being secured at one end in gas-tight sealed relation with an end wall portion of said enclosing housing, and said cooling unit being provided with a removable cover independent of the gas-tight seal between said cooling unit and said end wall whereby on removal of said cover access may be had from the axial end of said cooling unit to the interior thereof without providing an opening to the space within said enclosing housing.

SOREN H. MORTENSEN.